United States Patent
Bivens

[11] 3,771,858
[45] Nov. 13, 1973

[54] OPHTHALMIC LENS

[76] Inventor: Carl F. Bivens, 801 E. 26th St., Des Moines, Iowa

[22] Filed: Jan. 31, 1972

[21] Appl. No.: 222,347

Related U.S. Application Data
[63] Continuation-in-part of Ser. No. 15,533, March 2, 1970, abandoned.

[52] U.S. Cl............ 351/159, 351/168, 351/172, 351/176, 350/179
[51] Int. Cl............ G02c 7/02, G02c 7/06
[58] Field of Search............ 351/172, 168, 159, 351/167, 173, 176; 350/179

[56] References Cited
UNITED STATES PATENTS

| | | | |
|---|---|---|---|
| 744,982 | 11/1903 | Schneider | 351/159 |
| 2,868,075 | 1/1959 | Bivens | 351/163 |
| 2,169,404 | 8/1939 | Buttner | 351/159 X |
| 2,025,893 | 12/1935 | Polackoff | 351/171 |
| 1,952,394 | 3/1934 | Tillyer | 350/178 X |
| 2,024,552 | 12/1935 | Tillyer | 351/172 |
| 2,033,101 | 3/1936 | Tillyer et al. | 351/159 |
| 2,078,590 | 4/1937 | Spero | 351/159 X |
| 2,174,917 | 10/1939 | Dittmer | 351/159 |
| 2,642,776 | 6/1953 | Boeder | 351/172 X |

FOREIGN PATENTS OR APPLICATIONS

| | | | |
|---|---|---|---|
| 524,064 | 7/1940 | Great Britain | 350/179 |
| 1,279,252 | 11/1961 | France | 351/161 |

*Primary Examiner*—David H. Rubin
*Attorney*—H. Robert Henderson et al.

[57] ABSTRACT

This invention relates to an improved visual aid in the form of an ophthalmic lens comprising a comating pair of aligned lens parts, the part furthest from the eye being of a concave meniscus type lens, made of optical glass such as crown; and the part closest to the eye being of a plano-convex type lens, with the convex surface toward the eye, and made of optical plastic such as allyl diglycol carbonate.

5 Claims, 11 Drawing Figures

PATENTED NOV 13 1973 3,771,858

INVENTOR
CARL F. BIVENS
BY
Henderson & Strom
ATTORNEYS

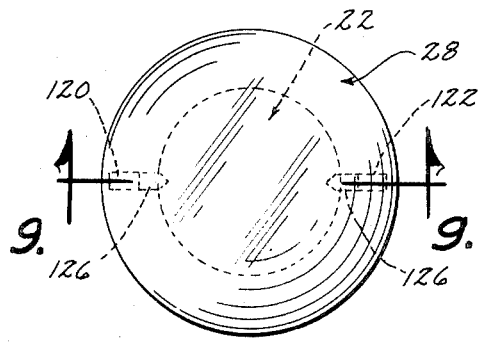
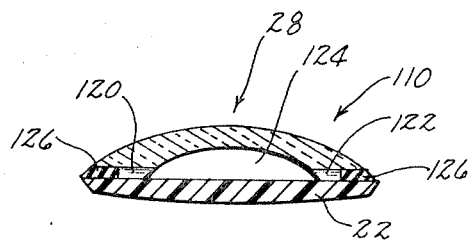
Fig. 8
Fig. 9
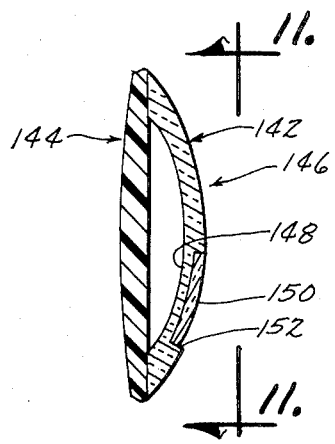
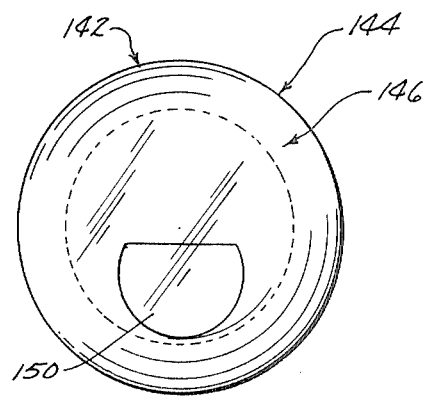
Fig. 10
Fig. 11
INVENTOR
CARL F. BIVENS
BY
Henderson & Strom
ATTORNEYS

OPHTHALMIC LENS

This is a continuation-in-part of ending application Ser. No. 15,533 filed Mar. 2, 1970 and entitled OPHTHALMIC LENS now abandoned.

BACKGROUND OF THE INVENTION

Where it is desired to provide a single spectacles which enable the user to have both distant and close acceptable acuity of vision, conventional spectacles are of either the bifocal or trifocal type. Other than the provision of a combination of lenses of the telescopic of Galilean system, which system is cumbersome, weighty and expensive applicant is unaware of any simple and economical combinations of lenses which provide this desired visual result, wherein the wearer of the spectacles does not have to shift his eyes upwardly or downwardly to obtain either distant or close acceptable vision.

SUMMARY OF THE INVENTION

The invention is comprised of a generic embodiment, with several species thereof; the generic embodiment of which includes a pair of comating lenses adapted by refractory power, shape, differing pupillary distance and type of material to provide vision with the user looking axially through the lens system, wherein the lenses maintain substantially a fu'l field of vision by being of substantially the same size.

It is an object of this invention to provide a new and novel lens system for aiding vision.

It is another object of the invention to provide an improved lens system for use in conventional spectacles frame.

Still another object of this invention is the provision of a lens system as characteried hereinbefore wherein the meniscus lens is made of glass, and the plano-convex lens is made of plastic.

Yet another object of this invention is a lens system capable of fulfilling the aforementioned objectives which is economical, practical, and provides acceptable visual acuity.

Another object of this invention is to provide a lens system which protects the eye against direct glass breakage.

These objects, and other advantages will become evident upon reference to the following description when taken in conjunction with the accompanying drawings.

BRIEF DESCRIPTION OF THE DRAWINGS

FIG. 8 is another modification of the embodiment of FIG. 1;

FIG. 9 is a sectional view as taken along the line 9—9 in FIG. 8;

FIG. 10 is yet another modification of the generic embodiment of FIG. 1; and

FIG. 11 is a view of the face of the lens system of FIG. 10.

DESCRIPTION OF THE PREFERRED EMBODIMENT

Figure 1:
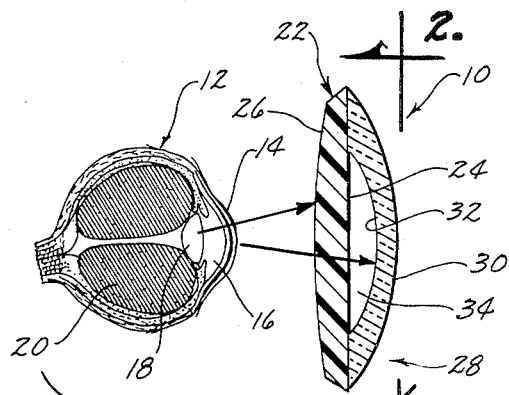
FIG. 1 is a schematic view of a human eye and one embodiment of the lens system of this invention shown in cross section, and shown in their normal relationship were the system part of spectacles held on the wearers head in a conventional manner.
Figure 2:
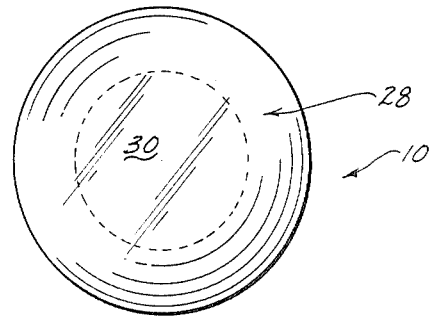
FIG. 2 is a vertical e'evational view of the front side of the lens system of FIG. 1.

The generic lens 10 of this invention is illustrated in FIGS. 1 and 2 and a reproduction of the human eye 12 is illustrated in FIG. 1. The cornea of the eye 12 is designated by the reference numeral 14 and the aqueous humor by the reference numeral 16. The lens of the eye is designated by the reference numeral 18 and the vitreous humor is designated by the reference numeral 20.

Lens 10 includes a rear lens 22 of the plano-converging type which is constructed of a suitable optical plastic material such as allyl diglycol carbonate, methacrylate, large molecular polyethelene or the like. A hard resin plastic is preferred. Rear lens 22 has a flat or plano front surface 24 and a convex rear surface 26. The rear lens 22 is generally circular in shape as seen in FIG. 2 but this configuration may be varied slightly if desired. Lens 10 also includes a front lens 28 having a convex front surface 30 and a concave rear surface 32. As seen in FIG. 1, the radius of curvature of the back surface 32 is less than the curvature of the front surface. Preferably, the base curvature of the front surface 30 should be approximately 6.20 to 6.50 dioptres of plus curvature as measured by a standard lens measure. Although the refractions, minus and plus, are shown near equal in the generic lens of FIGS. 1 and 2, the refractive powers of these and other lens depicted herein must vary according to the requirements of hypermetropia or myopia. The preferred thickness of the front lens 28 is approximately 1.8 mm to 1.9 mm which remains constant. The preferred thickness of the rear lens 22 is also the same, 1.8 mm to 1.9 mm, but said thickness will increase accordingly to the amount of plus dioptric refraction used in the rear lens 22. Thus, a one dioptre rear lens 22 will be approximately 3.8 mm of thickness for hypermetropia unless less refraction can be used in the front lens by patient test.

Figure 6:
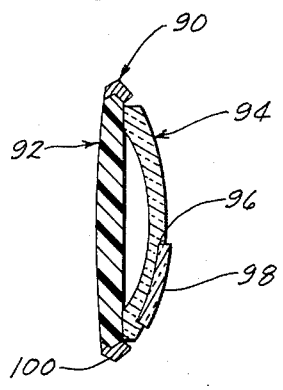
FIG. 6 is a third modification of the embodiment of FIG. 1.

As illustrated in FIGS. 1 and 2, front lens 8 is mounted on rear lens 22 in a superimposed concentric relation, thereby providing a compartment 34 therebetween (FIG. 2). Front lens 28 may be secured to rear lens 22 by a suitable adhesive or the like or may be held in position with a suitable frame or clamp means such as illustrated in FIG. 6. Additionally, it is preferred that compartment 34 be filled with a dry gas such as argon, nitrogen or the like to prevent frosting of the lenses. As seen In FIG. 2, lens 10 is designed so that the diameter of front lens 28 is less than the diameter of rear lens 22. Front lens 28 preferably is constructed of an optical glass material common to the optical art.

Figure 3:
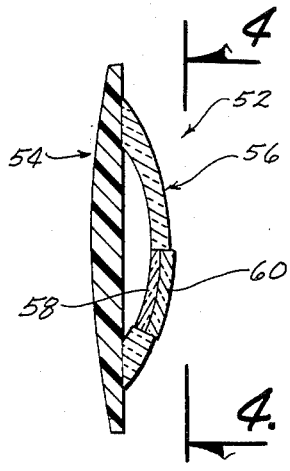
FIG. 3 is a first modification of the embodiment of FIG. 1.
Figure 4:
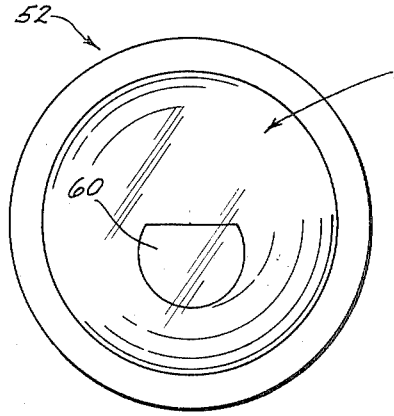
FIG. 4 is an elevational view of the front of the lens system of FIG. 3.

FIGS. 3 and 4 illustrate a lens 52 comprised of a rear lens 54 and a front lens 56. Lens 52 is substantially identical to the lens seen in FIG. 1 except for the lens segments 58 and 60 provided tYerein. It can be seen in FIG. 3 that the front surface of lens 60 protrudes outwardly of the front surface of lens 56. Additionally, lens segment 60 is of a greater thickness than lens segment 58. The radius of curvature of the front and rear surfaces of lens segments 58 and 60 are equal and can be compared normally, but not necessarily, to the curvature of the front surface of front lens 56. The curvature of the rear surface of segment 58 can normally, but not necessarily compare with the curvature of the rear surface of lens 56. The bifocal width of lens 52 can be as great as lens 40. The lens segments 58 and 60 provide the lens 52 with a distance bifocal means.

Figure 5:
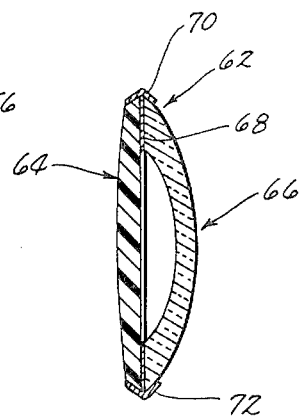
FIG. 5 is a second modification of the embodiment of FIG. 1.

FIG. 5 illustrates a lens 62 comprised of a plano-converging rear lens 64 and a concave meniscus lens 66 mounted thereon. A rubber or plastic insulation means 68 is positioned between the lenses 64 and 66 and the lenses are held together by means of V-shaped clamps 70 and 72. If desired, the lens of FIG. 5 may be provided with straight top power lenses.

FIG. 6 illustrates another lens generally referred to by the reference numeral 90 which is comprised of a rear lens 92 and a front lens 94. Lens 94 is provided with a cavity 96 extending into its lower front surface and which receives a bifocal lens segment 98. Lens segment 98 may be adhesively attached to the edges of the cavity 96 as well as annealed thereto. FIG. 6 also illustrates an alternative means of securing the lens to a frame 100. It can be seen that frame 100 receives the peripheral edges of rear lens 92 only.

Figure 7:
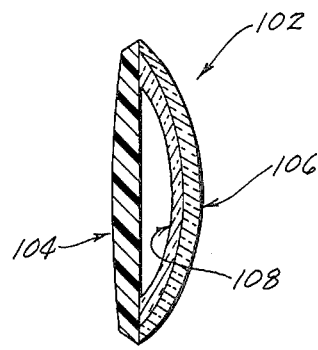
FIG. 7 is a fourth modification of the embodiment of FIG. 1.

FIG. 7 illustrates a lens 102 composed of a rear lens 104, a front lens 106, and an interior lens 108. The lens may be secured together by any convenient means such as by adhesive, frame or annealing. The radius of curvature of the front surface of front lens 106 is less than its rear surface radius of curvature. The radius of curvature of the rear surface of lens 108 is grater than the radius of curvature of the front surface of lens 106.

FIGS. 8 and 9 illustrate another lens embodiment generally indicated by the reference numeral 110. Lens 110 is identical to the lens system of FIGS. 1 and 2, except it is provided with a pair of oppositely disposed openings 120 and 122 extending through the front lens 28. The purpose of openings 120 and 122 is to facilitate the removal of the air from the compartment 124 and the insertion of dry nitrogen gas, argon or the like therein. A flexible plug 126 comprised of a plastic material or the like is mounted in each of the openings 120 and 122 to maintain the sealed condition of compartment 124.

FIGS. 10 and 11 illustrate another lens embodiment generally referred to by the reference numeral 142 and including lenses 144 and 146. Front lens 146 is provided with a cavity 148 formed in the lower front surface, which cavity receives a bifocal lens segment 150 for close work.

A doctor may wish to test a patient with both front and rear testing lenses simultaneously. In this case use a medium distance of 15 feet and use care in testing, as in conventional testing lenses the glass lenses are thick and glass is not as adaptable as plastic for the rear lens of combinations as taught by the inventor. Discomfort could result over a longer period of time testing. In the process of prescribing a pair of lenses, the doctors's patient may to some extent choose the amount of refraction used in the rear lens for hypermetropia or for the front lens for myopia which is best suited for hiS or her convenience. The patient should look through lenses having little or no refractive power, having either a 6.25, 6.37 or 6.5 dioptre base curvature. After choosing which one of these lenses, for example, if 6.37 is the most comfortable, the front lens, 28 (FIG. 1) for example, is thus produced with the 6.37 base curve. Assuming a +6.00 dioptre power is needed, the rear surface 32 is made with a −12.37 dioptre curvature, resulting in the lens having a refractive power of −6.00 dioptres. The rear lens 22 thus is formed with the rear surface 26 having +12.00 dioptre power, or twice that of the front lens 28, in order to obtain the desired power of +6.00 dioptres.

The best thickness of the front lens is approximately 1.8 mm to 1.9 mm which remains constant. The center thickness of the rear lens is also 1.8 to 1.9 mm approximately before plus refraction is added thereto but the thickness of the rear lens will increase accordingly to the amount of plus dioptric refraction used in the rear lens. Thus a one dioptre rear lens will be approximately 3.8 mm thick if used for hypermetropia because of the +2.00 dioptres of refraction contained therein.

The proper curvature of the front surface of the front lens is 6.20 to 6.50 dioptres of outward curvature as measured by a standard lens measure with 6.37 dioptres as the more universally used meniscus-diverging base curvature.

The "range of accomodation" of the eye should be considered in optical fitting. The eye will view either the meniscus-minus or the plano-plus with equal comfortability. The minus lens therein is adaptable for distance while the plus lens is adaptable for closer observation. The comfortable "range of vision" through opthalmic lens from "punctum remotum" to "punctum proximum" allows for greater flexibility of the ciliary process. The prism dioptre is used in this lens as in other lenses and has the same optical value in refractive correction in the dominant minus or plus refraction ratios as are contained herein as would any lens adjusted with "Sneelens test method" for obtaining eye prescriptions.

The "range of accommodation" of the bifocal units illustrated in FIGS. 3, 6 and 10 will vary with their general curvatures. The minus curvature of the rear surface of bifocal segment 60 (FIG. 3) is equal respectively to the plus curvature of ophthalmic lens 56 after the prescription is added. This makes lens 52 a distant bifocal lens with a range of 10 to 20 feet to close with good to fair reading acuity.

The bifocal segment in the lens of FIG. 6 is similar in distance to the bifocal segment in the lens of FIG. 3, since its rear minus curvature is equal respectively to the front plus curvature of lens 94 after the prescription is added. Thus, the bifocal lens of FIG. 6 is a distant bifocal lens with a range of from close to 10 or 20 feet, for good to fair reading acuity.

The convex front curvature of the bifocal segment 150 (FIG. 10) is respectively equal to the front convex curvature of the ophthalmic lens 146 after the prescription has been added. This makes the bifocal lens of FIG. 10 a close bifocal lens with a range of approximately close to 8 or 10 feet with good visual reading acuity.

In the case of hypermetropia bifocals, after the lens prescription is completed, the minus refraction of the bifocal segment 58 (FIG. 3) is equal to the amount of minus refraction in ophthalmic front lens 56. The plus refraction of bifocal segment 60 is maintained at a desired power demanded by eye test. To determine the plus refractive power of bifocal segment 60, add the plus refractive power of ophthalmic lens 54 thereto and subtract from the total the minus refractive power of bifocal segment 58.

The bifocal lens in FIG. 3 can be particularly applied for use in myopia. Also, since when high minus refraction is added to bifocal lens segment 58, which myopia correction demands, then the thickness of the front ophthalmic lens 56 can remain necessarily constant and not become too thick for good visibility.

For myopia bifocal correction after the lens prescription is completed, use the lens of FIG. 3. Place an amount of plus refraction in segment 60 equal to one-half the amount of plus refraction contained in ophthalmic rear lens 54. The minus refractive power of segment 58 can then be raised to an amount demanded by eye test. Bifocal segment 58 can be reduced in a minus refractive power for better clarification for close vision if the plus refractive power of the lower part only, the rear ophthalmic lens 54, is reduced to approximately one-half the plus refractive power of rear lens 54 by molding etc. The amount of reduction in minus refraction of segment 58 is also equal to the amount of plus refraction contained in rear lens 54 for distance prescription and the bifocal unit will still maintain the same visual acuity.

The total plus refraction of segment 60 and rear lens 54 is substracted from the minus refraction of segment 58 to determine the dominant minus refraction of the bifocal window or lens 52 (FIG. 3) for myopia correction.

The lens in FIG. 7 is multifocal lens worn to retract at a closer range than ophthalmic lenses. Also it can utilize the prescription of a bifocal lens. The lens has several other uses; such as for difficult hypermetropia vision, difficult myopia vision with fundus, or difficult vision when eye lenses have been removed by cataract or other surgery, etc. The plus refractive power can be increased in the lower part only of lens 106 (FIG. 7) by molding the front surface to serve as a bifocal unit would serve. A bifocal unit may also be considered for the same location as the molding, to be used instead of the molding.

If an eye lens has been removed, sometimes as much as 16 dioptres of plus refraction is needed to restore vision to the eye. Much aberation and visual inversion is apparent when correction is attempted with a single plus refractor lens so a smaller field of vision is necessary to overcome these abnormalities of refraction. The lens in FIG. 7 will furnish sufficient clarified plus refractive power to correct the eye without its lens and still maintain a full-width field of vision.

The normally maximum lens prescription formula used in the lens of FIG. 7 to replace the plus refraction power due to loss of eye lens by surgery or otherwise establishes 16 plus dioptres of refraction in the front or objective lens 106 (FIG. 7), 16 minus dioptres of refraction in the intermediate lens 108, and 16 plus dioptres of refraction in rear or visual lens 104. The multifocal lens 102 (FIG. 7) will then have a dominant plus refraction of 16 dioptres for use to replace refraction lost to the eye by eye lens removal.

The glass lenses of this invention should be constructed of suitable optical glass such as crown, flint or other equivalent glass common to the optical art. Additionally, coatings, and prisms can also be utilized. The curvatures illustrated in the lenses herein may be varied to conform to the particular prescription.

Thus it can be seen that a new and unique lens has been described which corrects the vision of the wearer. Several embodiments have been illustrated and described which provide various bifocal means, support means, etc. Thus it can be seen that the lens of this invention accomplishes at least all of its stated objectives.

I claim:

1. An ophthalmic lens comprising:

a negative front lens part having a meniscus shape, with a convex front surface and a concave rear surface, the radius of curvature of the rear surface being less than the radius of curvature of the front surface;

a positive rear lens part having a plano-convex shape, with a planar front surface and a convex rear surface, said rear lens part being formed of a transparent plastic material and with said front lens part being formed of a transparent glass material, said lens parts being of substatially equal diameter;

the circular rear edge of said rear surface of said front lens part being flat, an adhesive material securing said rear edge to the periphery of said planar front surface of said rear lens part in superimposed concentric relation to define a sealed hollow compartment between said lens parts; and said sealed hollow compartment formed between said lens parts being filled with an inert gas.

2. A lens as defined in claim 1, and further wherein the base curvature of said front surface of said front lens part is from 6.20 to 6.50 dioptres of plus curvature.

3. A lens as defined in claim 2, and further wherein the center thickness of both said front leans part and said rear lens part is from 1.8 mm to 1.9 mm.

4. A lens as defined in claim 3, and further wherein an annular blank of insulation having a configuration identical to that of said front lens part circular rear edge is secured between said lens parts.

5. A lens as defined in claim 4, and further wherein one or more V-shaped clamps embrace and secure the exposed outer edges of said combined lens parts.

* * * * *